(12) United States Patent
Vala et al.

(10) Patent No.: US 6,246,464 B1
(45) Date of Patent: Jun. 12, 2001

(54) ILLUMINATION SYSTEM

(75) Inventors: John D. Vala, Plymouth; Clive E. Catchpole, Birmingham; Johan P. Bakker, West Bloomfield; Robert T. Rourke, Troy; Paul Stolis; Gary B. Copenhaver, both of Canton; David J. Valice, Troy; David J. Concannon, Farmington Hill, all of MI (US)

(73) Assignee: Unisys Corporation, Blue Bell, PA (US)

(*) Notice: Subject to any disclaimer, the term of this patent is extended or adjusted under 35 U.S.C. 154(b) by 0 days.

(21) Appl. No.: 07/935,507

(22) Filed: Aug. 26, 1992

Related U.S. Application Data

(60) Continuation of application No. 07/811,337, filed on Jan. 29, 1992, which is a division of application No. 07/651,887, filed on Feb. 7, 1991, now Pat. No. 5,089,713, which is a division of application No. 07/419,572, filed on Oct. 10, 1989, now Pat. No. 5,003,189.

(51) Int. Cl.⁷ .................................................. G03B 27/54
(52) U.S. Cl. ............................................................ 355/70
(58) Field of Search ........................................ 355/67, 70

(56) References Cited

U.S. PATENT DOCUMENTS

| 4,220,982 | * | 9/1980 | Martino . |
| 5,089,713 | * | 2/1992 | Vala et al. ............................ 250/566 |

* cited by examiner

*Primary Examiner*—Safet Metjahic
*Assistant Examiner*—Michael Dalakis
(74) *Attorney, Agent, or Firm*—Nathan Cass; Mark T. Starr

(57) ABSTRACT

In a document processing array, an imaging/illumination arrangement for illuminating and imaging the documents at one or several imaging-sites as they are rapidly transported there-past, each site having, as its illumination source, a hollow Lambertian integrating cylinder housing lamps which project essentially all their light onto the inner cylinder walls to be reflected/diffused thereby in Lambertian fashion and sent to the imaging site(s).

20 Claims, 15 Drawing Sheets

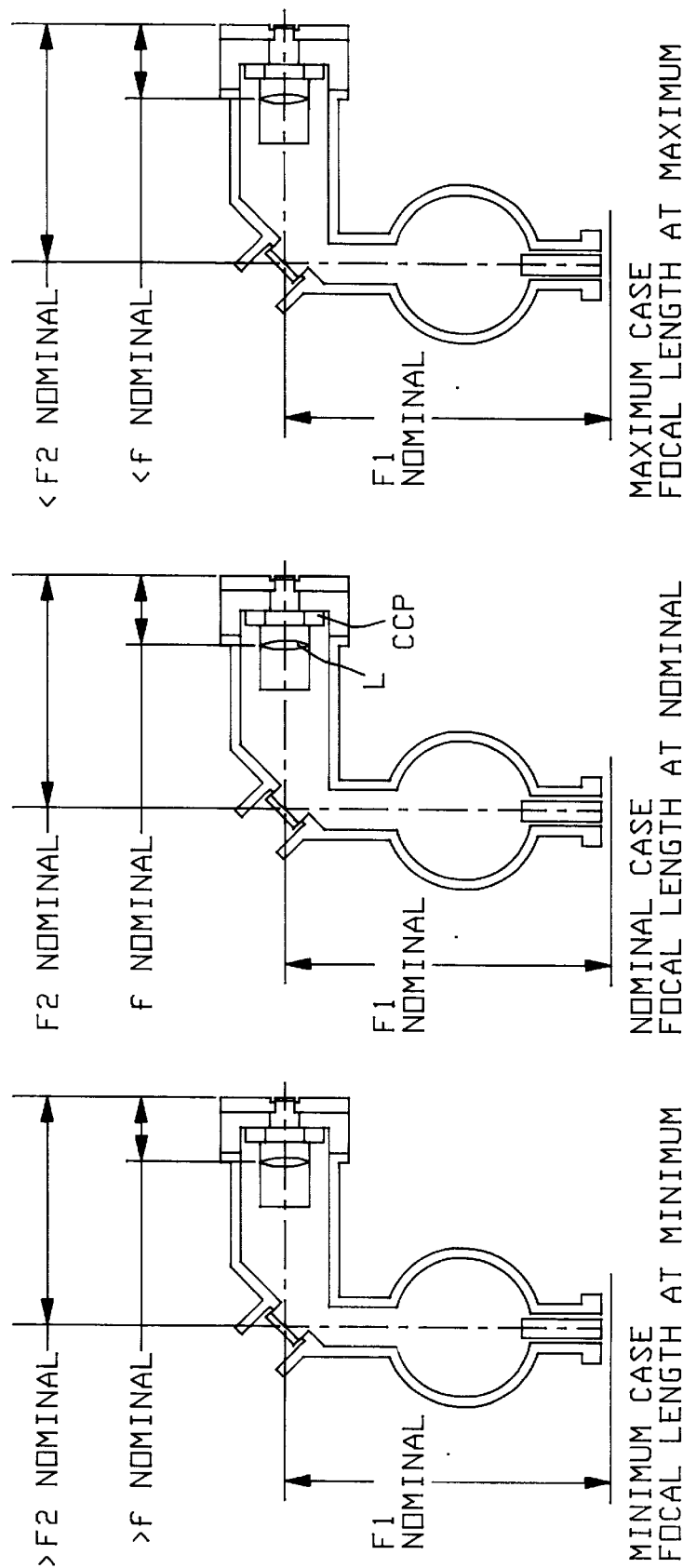

ILLUMINATION SYSTEM

This is a Continuation-in-Part of our U.S. Ser. No. 07/811,337 filed Jan. 29, 1992 which is a Division of our U.S. Ser. No. 07/651,887 filed Feb. 7, 1991 and now U.S. Pat. No. 5,089,713, which, in turn, is a Division of our U.S. Ser. No. 07/419,572 filed Oct. 10, 1989 and now U.S. Pat. No. 5,003,189, all having common inventors and being commonly assigned. We hereby claim the filing dates of the foregoing as the effective filing date of the instant case as regards all common disclosed subject matter.

FIELD OF THE INVENTION

This invention relates to illumination systems and more particularly to associated techniques yielding intense, Lambertian beams.

BACKGROUND, FEATURES

Document processing is a well developed art today; for instance, witness the processing of bank checks, remittance documents and other documents of finance handled by the millions every day in banks all over the world. To handle this incredibly large volume of paper, banks rely on high speed document processors that feed thousands of documents per minute past various processing stations. [E.g. Unisys Corp. has DP1000, DP1800 and 9195 high speed document processors that handle 1000, 1800, and 2600 documents per minute, respectively.] Processing a bank document typically involves some or all of the following steps: e.g., document-feed, reading magnetic ink recognition characters (MICR), reading optical recognition characters (OCR), printing endorsements, microfilming, sorting/stacking (routing documents to pockets), and imaging (see FIG. 1A).

The imaging task typically involves: Acquisition, processing, compression, storage, transmission, display, printing, and archive of images. This invention involves producing an image platform apt for integration with a high speed sorter for acquisition, processing, and compression; with storage retrieval modules for storage and image management; with image workstations for display; image printers for print; with optical disk subsystems for archive, and with means to transmit images, point to point, and local area networks (see FIG. 1B). Mainframe computer "hosts" can link multiple imaging document processors, and associated storage retrieval modules and other peripherals to create a large scale system (e.g. see FIG. 1C).

For image-acquisition, we prefer to use a camera which provides the system with images of the front and rear of the processed documents; e.g. facsimile images which are adequate for a customer's needs.

THE PAPER MOVER

To fix the parameters of camera design, one must consider the mechanical transport that moves documents past the camera sensor. The document transports here contemplated can propel paper past processing stations at track speeds of 100 to 400 inches per second (ips). The 5 mil thick documents (0.005") move along a track that is made 70–90 mils wide (TRACK GAP) in order to minimize jams and accommodate staples and other foreign objects that may be still attached to a document.

Document size determines the field of view required to image a maximum-height document. Most documents here contemplated (e.g. checks) are 2.75 to 4.75 inches high and between 6 and 10 inches long. A document may exhibit "skew" as it travels through the transport and so require a field of view higher and wider than the actual document size.

Camera design is also affected by a transport's degree of "document control", i.e. how much excess paper-motion (within track-width) is permitted in the area of image acquisition. Control techniques range from costly vacuum belt systems that minimize paper movement across the track to 20 mils or less, to less restrictive approaches that allow more document motion, but cost less. The tradeoff between minimum vs. maximum document control involves cost, complexity and—most important to the camera designer—the depth of illumination, and the amount of light required to properly illuminate the document in the image acquisition area.

In the instant embodiments we opt for minimal document control to reduce cost of the lower overall system and to increase transport reliability (minimize jams); thus, we must maximize the output of the illumination source—as a salient object hereof.

ILLUMINATION SOURCE

Selection of the illumination source is influenced by the depth of illumination desired and by the image sensor one selects (this dictates the sensor light input required). As documents are propelled past the image sensor at from 100 to 400 ips, there is little time to accumulate enough photons to form an acceptable image (i.e. to meet signal to noise and dynamic range requirements) so one tends to maximize light input.

There are some elegant sensor arrangements, such as time delay integration (TDI) devices, that reduce input light requirements, but these bring along their own unique set of needs such as synchronization of document motion. Also they tend to be "custom" arrangements using components with limited commercial availability and to involve package configurations (electrical and mechanical) that are non-optimal for our contemplated applications. Our image sensor of choice is a "sensor chip", such as the Reticon RL1288D, or a like chip which provides compatible output data rates of up to 80 MB/s and is priced attractively (e.g. the cost of a custom chip).

The type of light reaching our image sensor is very important for proper acquisition of color information from a document. We expect to satisfy the "eyeball test": i.e. "If I can see it on the document, I expect to see it in the image." Although "downstream processing" (after the camera acquires the image) can remove information, it cannot recover information that the camera doesn't acquire. Therefore it is important that the camera provide a representation, or facsimile, of the original document that is as faithful as possible.

Thus, the color response (spectral response) we require of our image camera will be the response of the human eye, i.e. "photopic response". Taking "photopic response" as our norm, we must factor-in the frequency response of our sensor, the output spectrum of our light source spectrum, and the effects of our optical-path-elements. To account for all these we interpose a photopic filter in the light path to the sensor—i.e. to emulate the desired photopic response.

Although photopic response is our "baseline", it is also useful to further shape sensor (spectral) response. For example, we find, we have found that a slight "red shift" (moving sensor response curve toward the red), with modifications to the response curve edge rates, gives optimal results for applications requiring "drop-out" of red inks.

GENERAL CONSIDERATIONS

One will optically-couple his light source and image sensor with suitable optics (e.g. lenses, mirrors), and prefer to package all this as an integral illuminator-camera unit which can be integrated into a pre-existing document processor. [E.g. a front and rear camera system]. The light from the illumination source will normally travel through a series of mirrors, lenses and fiber optics prior to reaching the document. A preferred lamp is a high output, tungsten-halogen filament type, less preferred is a xenon arc lamp that is highly efficient in the visible spectrum; and, for "slower" document speeds, certain fluorescent lamps are acceptable. All the optics are optimized with reflective (AR) coatings to minimize light loss.

With a passing document so illuminated, front and rear, it can present reflected-light images to the image sensor via relay optics and an "imaging lens" specially selected to produce picture elements (or "pixels") that are properly sized for downstream image processing algorithms. An important characteristic of such imaging lenses is their magnification tolerance; i.e. the sensitivity of subsequent processing to pixel-size variation. We have taken a conservative approach here to insure highly repeatable pixel dimensionality through appropriate selection of the image lens focal length. Depth of focus or the ability to stay in focus throughout the track gap is another key design parameter.

LIGHT-TO-VOLTAGE TRANSLATION

Having brought a reflected image (e.g. from front and rear of document) to the image sensor, we next need to convert this into a video signal that can be understood by our imaging electronics. The electrical signals output by our sensor chips need to be conditioned, amplified, filtered and then converted to a digital form by an analog to digital (A/D) converter.

Here, the linearity of the signal is a consideration. [Note: the response of camera electronics to light is usually linear.] Techniques to modify that response, such as using logarithmic response means, help to increase image-information at lower light levels. Whatever technique is used requires careful design and characterization to insure proper operation. One should also consider "effective grey levels" (as opposed to the number of quantitized grey levels defined by the bit width of the A/D chip); these being understood as the "real" number of grey levels present in an image. Black level stability of the camera electronics to maintain its relationship to incident reflected light is also important.

A key design parameter for a successful image camera design is cleanliness—i.e. keeping everything clean, despite an operating environment which is often laden with dust. Workers know that the myriad of documents rapidly thrust through the document processor (thousands each hour) tend to shed "paper dust". This dust accumulates rapidly and can compromise image quality; e.g. if it penetrates into the camera and settles on the wrong surfaces; "Dark images" or images with horizontal streaks can then result. Thus, our preferred illuminator-camera combination is completely sealed against dust so that no internal optical surfaces may be contaminated.

PROBLEMS FACED

Many difficulties and disadvantages of present systems relate to how well the paper documents tolerate processing and handling. If checks, etc. are lost or damaged by processing equipment and/or by personnel, one may find errors in reconciling and balancing document transactions and in reporting to customers (e.g. monthly statement).

Workers recognize that electronically-stored data ("electronic images") can be processed much quicker, more reliably and less subject to error. But to do so, one must first capture an accurate image, or modified image, of the physical document and convert this into electronic computer signals. These image-signals can then be manipulated (e.g. be reproduced for visual review, be sorted and distributed, etc.) much more rapidly, easily and reliably than physical documents.

CONVENTIONAL APPROACHES

Workers are beginning to think of using imaging technology as a way of improving document processing, as disclosed, for example, in U.S. Pat. Nos. 4,510,619; 4,205,780; 4,264,808; 4,672,186 and 5,089,713. Generally, such imaging involves optically scanning documents to produce electronic images that are processed electronically and stored on high capacity storage media (such as magnetic disk drives and/or optical memory) for later retrieval and display. It is apparent that document imaging can provide an opportunity to reduce manual handling and manipulation of documents, since the electronic images can be used in place of the actual documents.

It would be somewhat conventional to effect "image capture" with video cameras; e.g. using two light sources, one to illuminate each side of a document. Successive document-images ("image slices") could then be reflected from the document, front and back, into respective front/rear video cameras. These can convert the optical image into electronic signals; which can then be converted by appropriate circuitry into digital signals.

This invention addresses such problems; e.g. teaching use of high-intensity, well-cooled light source means integrated into a Lambertian structure, and housed with associated optical components in a single overall, sealed structure with camera (sensor) means. Also, the taught arrangement is preferably modular (e.g. to plug-in to a relatively conventional check sorter); and it should simplify service and manufacture by using interchangeable, easily-installed components. The system disclosed uses a simple lamp-housing Lambertian cylinder, with internal surfaces coated for high reflectance, yet diffusing. The structure is adapted for use in a high speed, automated "image-lift" system; e.g. one capable of accommodating the resent advanced needs of financial institutions for document processing.

An object hereof is to address at least some of the foregoing problems and to provide at least some of the mentioned, and other, features and advantages.

BRIEF DESCRIPTION OF THE DRAWINGS

These and other features and advantages of the present invention will be appreciated by workers as they become better understood by reference to the following detailed description of the present preferred embodiments which should be considered in conjunction with the accompanying drawings, wherein like reference symbols denote like elements:

FIG. 1A is a flow chart showing typical check processing functions, while

FIG. 9 is a very simplistic, conceptual sketch of one Lambertian cylinder light source/image sensor embodiment, while

FIGS. 14–16 depict respective "nominal", "minimal" and "maximum" focal length situations.

DESCRIPTION OF PREFERRED EMBODIMENT

Overall document processor concepts will be discussed; then details of our preferred Lambertian illuminator means. The methods, materials, devices and means discussed herein will be generally understood as implemented and operated according to known expedients and present good practice, except as otherwise specified.

DOCUMENT PROCESSOR BACKGROUND

Before giving more details of the subject image-lift embodiment, it will help to indicate an exemplary use-environment in which such an embodiment can be employed. Such is the document handling arrangement we show in FIGS. 1–7 (called "System DH").

Figure 1A:
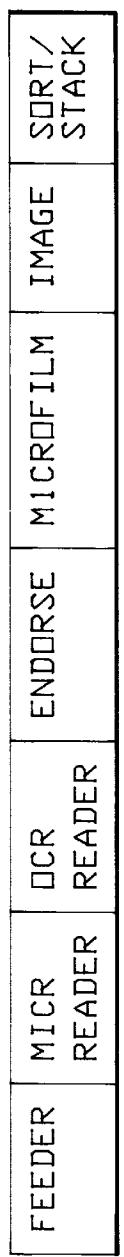
Figure 1B:
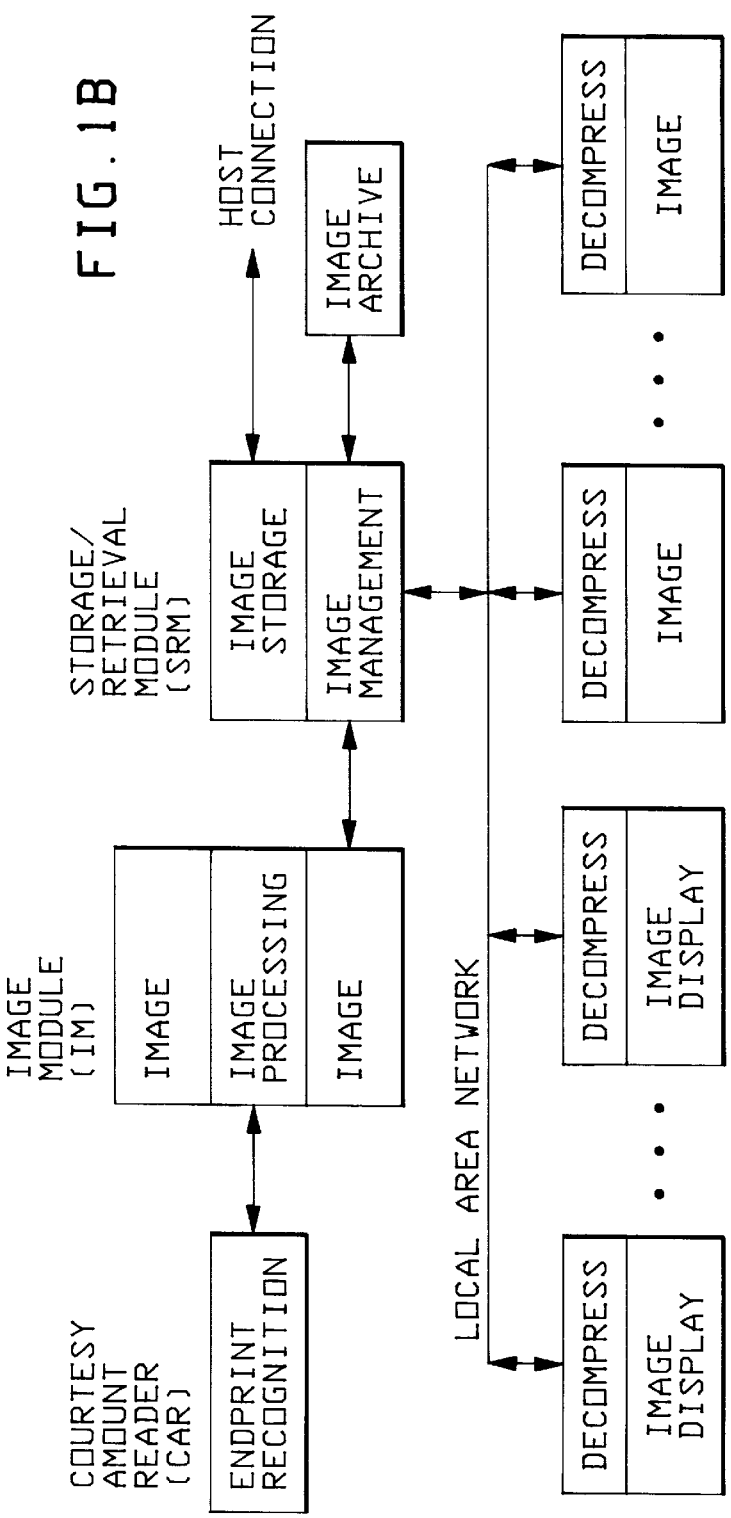
FIG. 1B is a related document imaging system, schematically indicating imaging according to an embodiment hereof, and FIG. 1C functionally indicates a number of imaging/storage units linked by a Host computer.
Figure 1C:
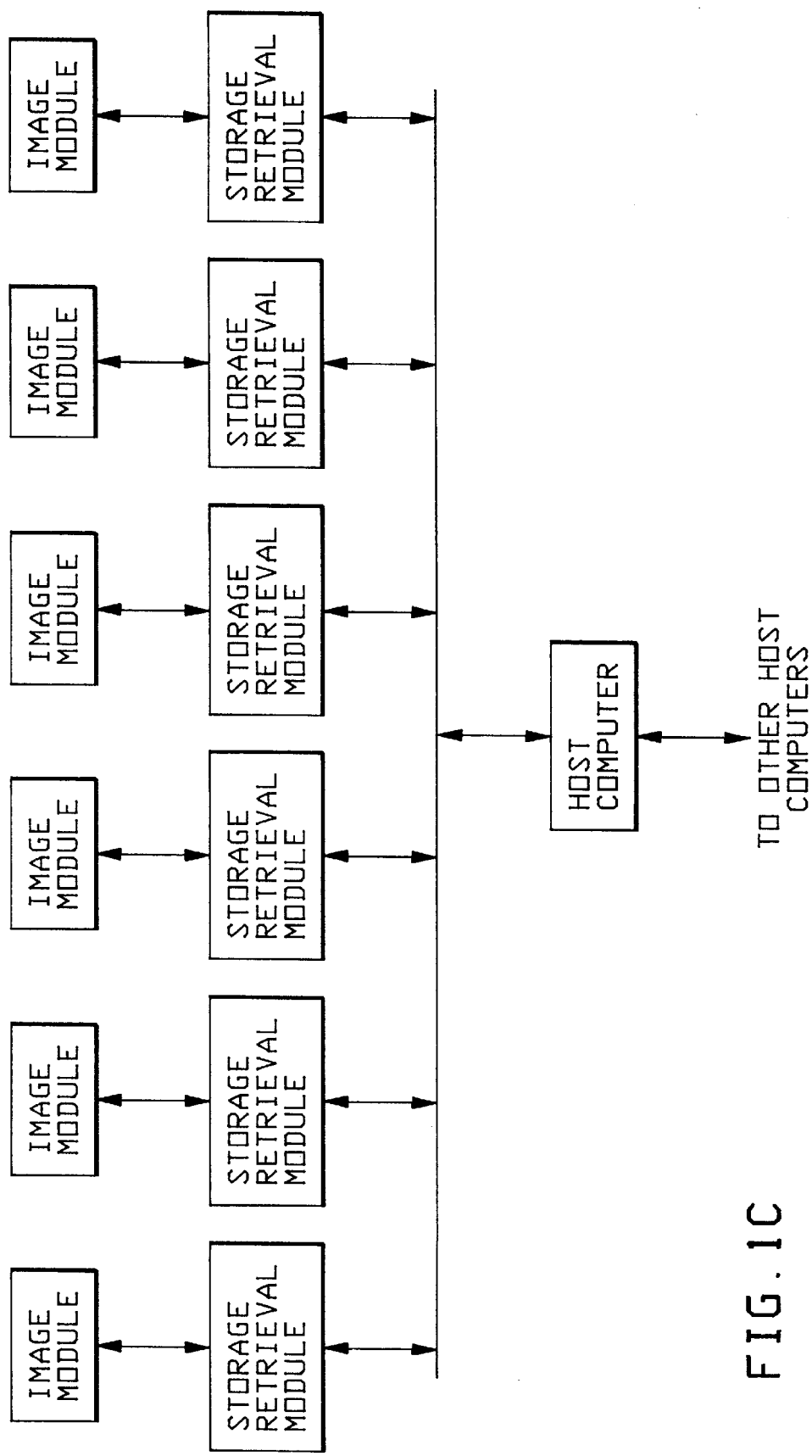
Figure 2:
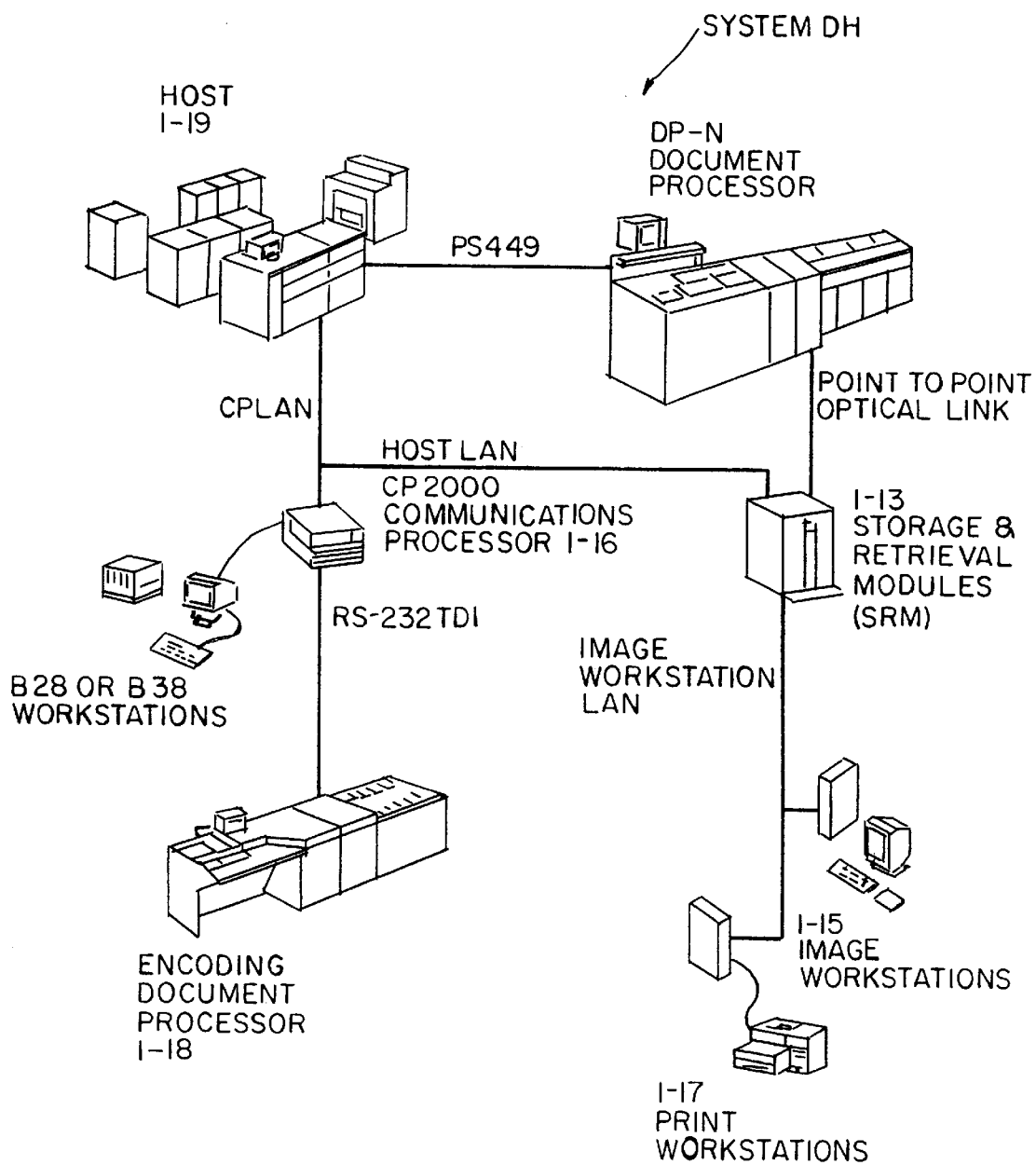
FIG. 2 is a perspective schematic of an idealized Document Handling System DH apt for using our invention.

In FIG. 2, System DH may be seen to comprise a Document Processor 1–11 coupled to a Host Computer system 1–19 and one or more Storage/Retrieval modules (SRM) 1–13. Workers will understand that documents (e.g. checks, etc.) are to be fed into Processor 1–11 and rapidly transported thereby past various processing-stations (e.g. microfilm and imager as described below) and directed to one of several sort-pockets (see FIG. 3). An "Electronic-image" of each document is "lifted" and sent to a designated SRM 1–13 for storage (e.g. on disks, as known in the art). The SRM(s) communicate with Host 1–19 and with various Workstations (e.g. one of more Image Workstations 1–15; a Print Workstation 1–17). System DH also includes an Encoder 1–18 (e.g. to imprint MICR characters on checks) and related communications and workstation units.

Figure 3:
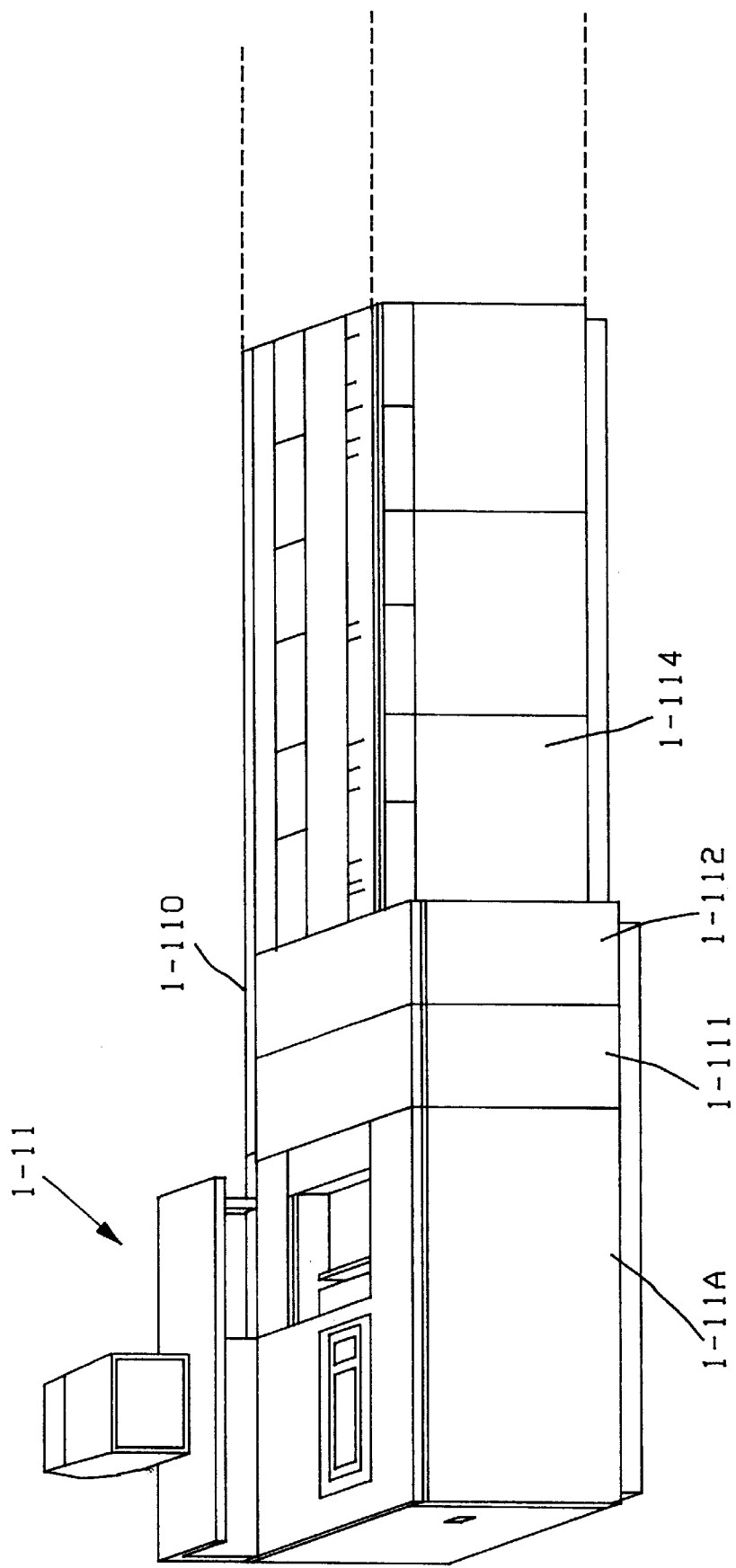
FIG. 3 is an idealized perspective of a Document Processor portion of this system DH.
Figure 4:
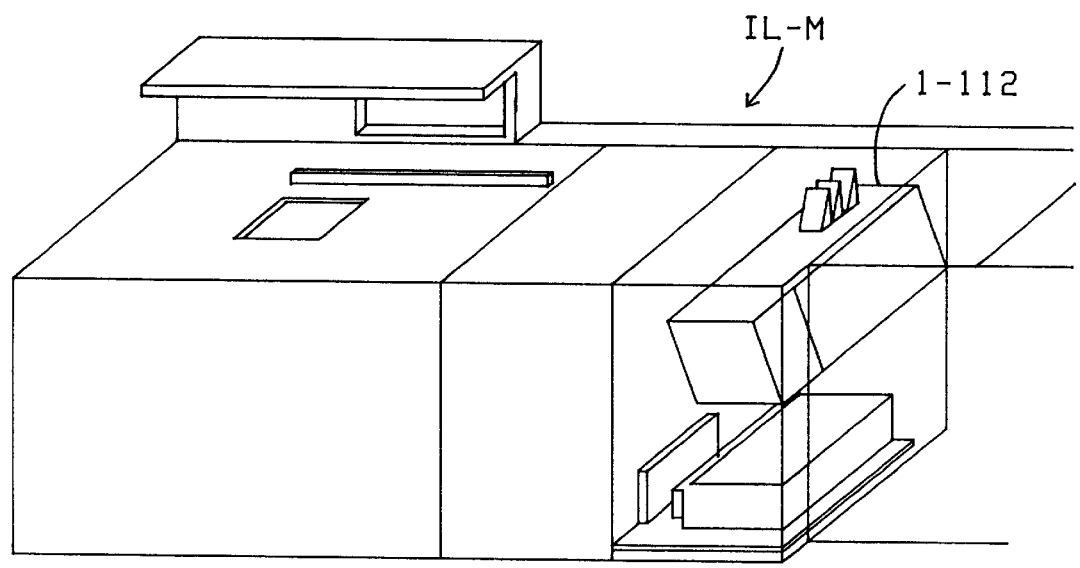
FIGS. 4, 5 showing in partial-perspective certain submodules thereof.
Figure 5:
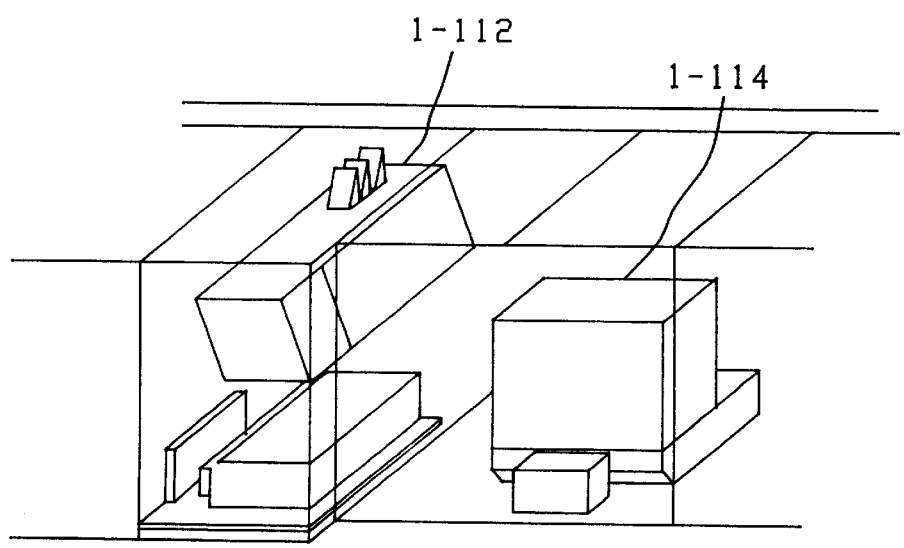
Figure 6:
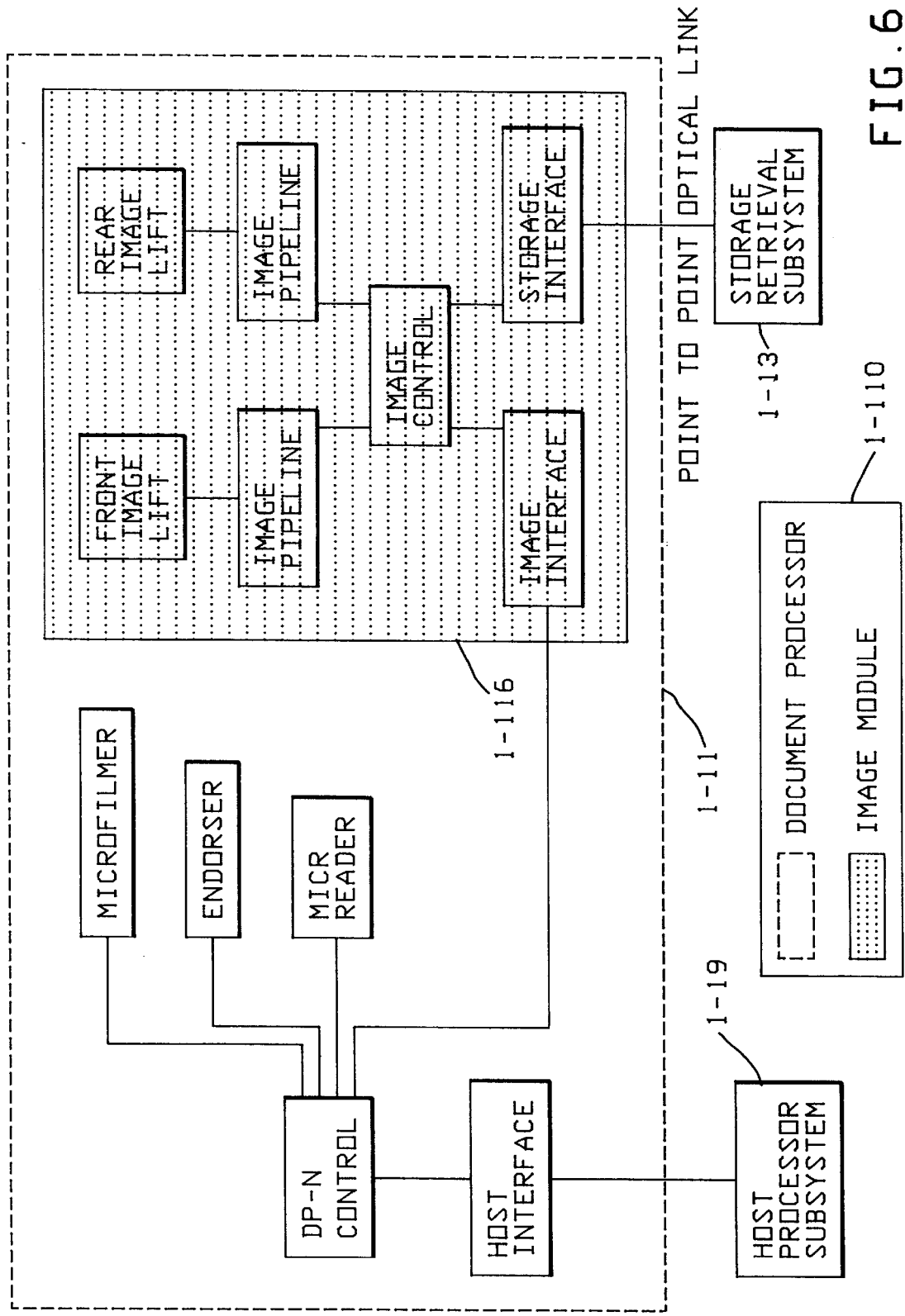
FIG. 6 is a block diagram showing functional units of this Document Processor; while FIG. 7 diagrams image-signal flow therein.
Figure 7:
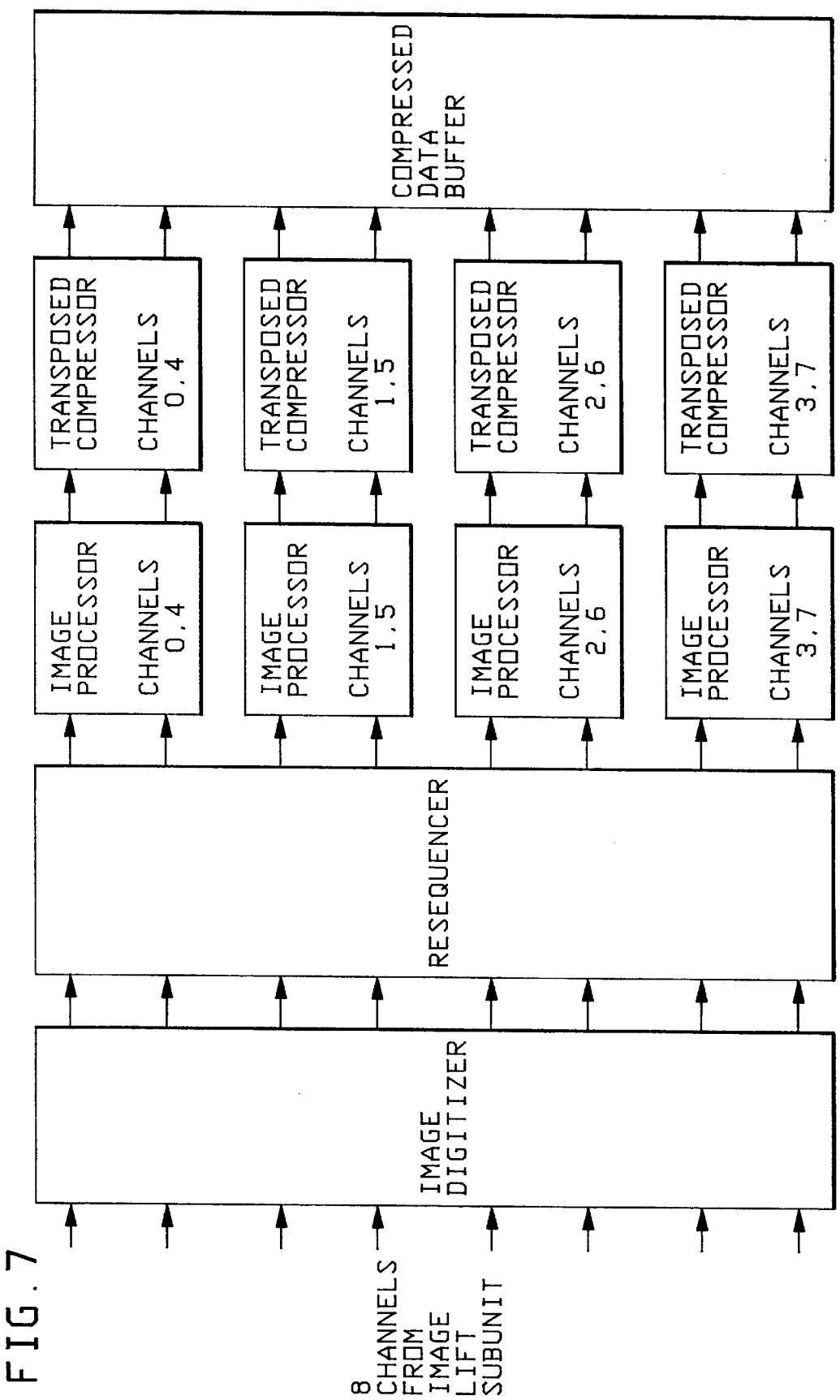

FIG. 3 indicates sub-units (modules) of Sort/Processor 1–11, including an image-lift camera module 1–112 and associated electronics submodule 1–114 (see FIGS. 4, 5). FIG. 6 very schematically (black-diagrammatically) indicates imaging and other functional units; while FIG. 7 schematically indicates how some image-lift signals are processed. Other details of such arrangements may be found in our cited U.S. Pat. No. 5,089,713, hereby incorporated herein, to the extent relevant, by this reference.

Document images are to be captured at the real-time sorting speed of the document processor. For high-speed document processors, the sorting speed is about 1800+ documents per minute (300 inches a second, track speed); lower speed document processors sort documents at approximately 1000 (or less) documents a minute (e.g. 150 inches a second, track speed). Acquiring electronic representations of documents traveling at these speeds is a real challenge and requires specialized hardware and software.

Preferred Illumination Embodiment I—in general

Details of our preferred Lambertian cylinder illuminator are given below, but first some general concepts will now be explained, referring to FIGS. 9, 10.

Figure 9:
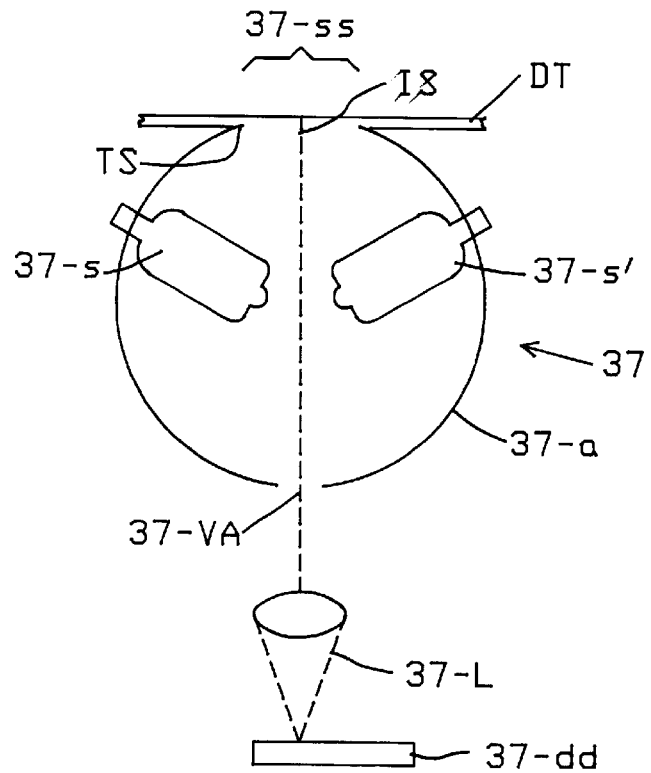
Figure 10:
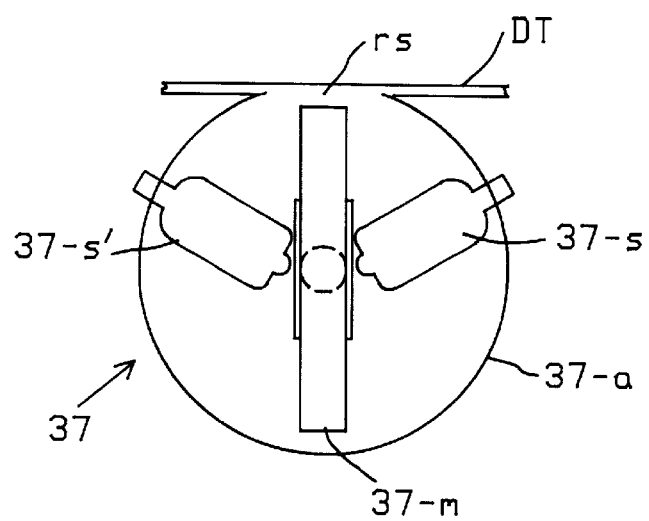
FIG. 10 shows the same with the sensor within the cylinder.

FIG. 9 is a top sectional view of Lambertian source means 37 illuminating a passing document track DT. FIG. 9 shows document track DT where subject documents are understood as transported at high speeds (as known in the art) past a Lambertian illuminator unit 37 and a related document-imaging site IS, generally defined along DT by an imaging slit TS in the cylinder 37a of unit 37. At site IS, successive "slices" of the passing document are to be illuminated and "electronically imaged" as known in the art. Illumination of each site slit is to be with a special prescribed source of highly uniform, highly diffuse "Lambertian" light from cylinder 37a.

That is, illumination-site IS, is to be illuminated with lamps 37-S, 37-S' in the ("hollow-integrating/Lambertian cylinder") which direct substantially all their light to be reflected/diffused by cylinder walls IW, and which project a "bar" of intense, uniform (spatially) highly-diffuse wall-reflected light through TS at site IS (facing the rectangular slit from which the illumination emanates) to impact a passing document. Inner cylinder walls iw are treated (coated) to render nearly-perfect reflection and diffusion in the Lambertian manner.

Figure 9A:
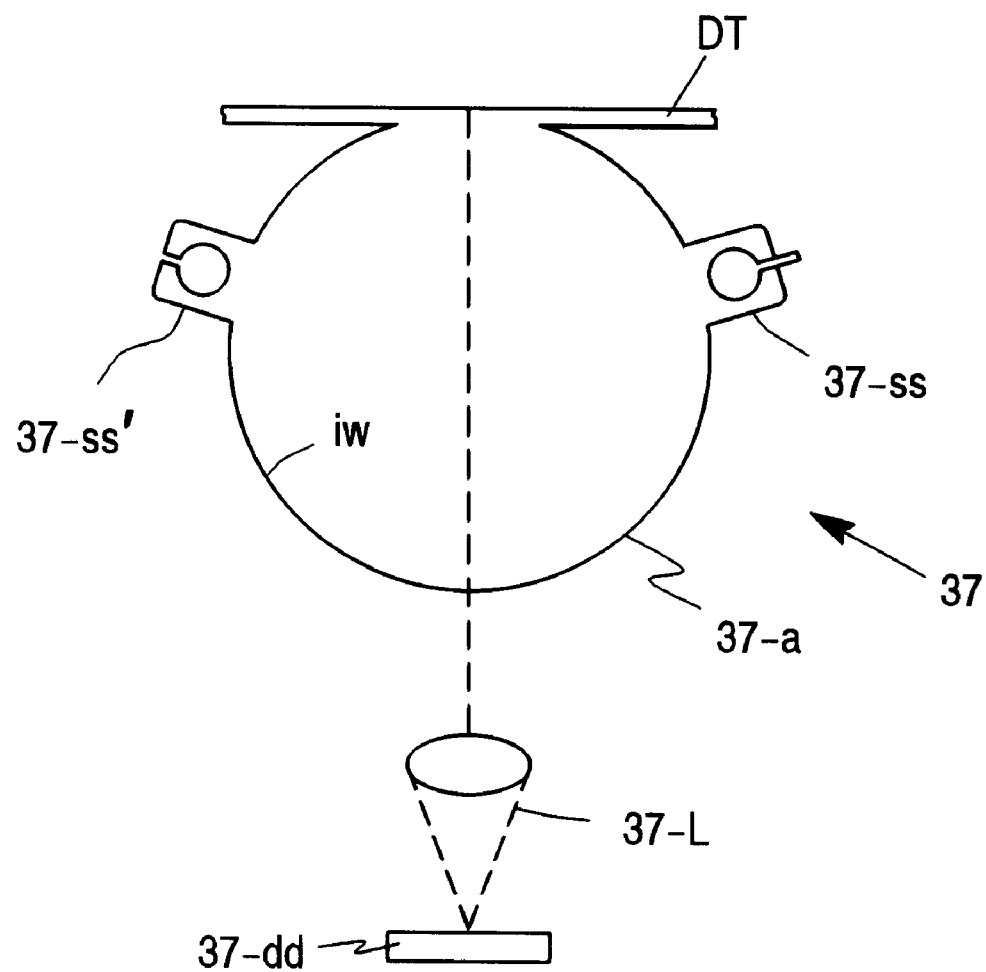
FIG. 9A shows the same with lamps outside the cylinder.

Our preferred Lambertian source will be understood to generate an output with characteristics similar to a Lambertian emitter and distributed in linear fashion. The output will appear as a non-coherent source of monochromatic (or panchromatic) light emitted from an aperture (cylinder slit) with a relatively high aspect ratio (length to width). The internal source(s) of luminance may be: incandescent bulbs, fluorescent lamps, gas discharge lamps, laser sources (or other optically pumped emitters) or other luminous sources such as the output of a fiberoptic bundle. The placement of the source(s) within cylinder 37a is not critical (only two shown in FIG. 9: 37-S, 37-S'), but may slightly impact output uniformity. In certain cases the lamps may be located outside the cylinder (e.g. see lamp-units 37-SS, 37-SS' in FIG. 9A, which otherwise shows the same as FIG. 9). The intensity profile as a function of distance from the exit aperture is very uniform and predictable and allows for a considerable "depth of illumination". As a feature hereof, components comprising this Lambertian-cylinder" source are readily available, easily manufactured from standard materials and do not rely on the critical placement of any other component.

A typical embodiment for such a Lambertian source will include:

a. A hollow "integrating cylinder" (e.g. 37a, FIGS. 9, 10) provided with an illumination aperture (e.g. slit TS) cut along the cylinder axial-length [and radially offset from other such apertures]; it allows for the intromission of an array of light sources;

b. The cylinder interior is coated with a high-reflectivity Lambertian (diffuse) reflector;

c. The cylinder assembly is placed in proximity to the site (IS) of passing target documents requiring uniform illumination.

d. Note: light emitted from a source lamp(s) is reflected and scattered with very little loss throughout the entire internal cavity of the cylinder, eventually finding egress at the exit aperture (slit TS).

One preferred embodiment of such a Lambertian light source is very simplistically indicated in FIG. 9. This end view of the cylindrical source shows;

aa. A hollow cylindrical body 37a with its interior coated with a high reflectivity, diffuse material;

bb. Exemplary lamp means (37-S, 37-S') used to illuminate the interior of the cylinder cavity, producing multiple internal reflections before exiting the cylinder. Each lamp 37-S, 37-S' may be understood to represent one, or a set of identical sources; in the "least case", one may use only one lamp 37-S, (e.g. a second 37-S' may be kept as a standby).

cc. A rectangular "bar" of light emitted from cylinder 37a is positioned in proximity to the document site (IS), the documents being understood as moving across the slit of light.

dd. The light reflected from the document can returns back through the Illumination Aperture (slit TS), then out through a second Viewing Aperture (e.g. 37-VA), to Image-Lens means (37-L), to be imaged onto (sensed by) a linear sensor array [preferably a CCPD Detector Array or Camera, 37-d].

ee. The scan rate of the CCPD Camera is synchronized to the linear velocity of the object (e.g. document) so as to take repeated "slices" of the object as it passes.

Advantages of Lambertian Light Source

Lambertian characteristics of this light source inherently produce uniform and glare-free illumination. Workers will understand that a "Lambertian" source yields illumination that is highly-diffuse and highly-uniform. Thus, when we specify the inner walls of hollow cylinder 37a as "Lambertian", it will be understood that they act to give "near-perfect" reflection/diffusion of the emitted source light (e.g. no "filament image" will be perceived, as workers know). As elsewhere detailed, we teach doing this via a particular (Lambertian) coating on these inner cylinder walls. Thus, we characterize hollow cylinder 37a as "Lambertian". We further characterize it as "integrating" in that, no matter how many lamp-sources are used therein, or how emissions therefrom may vary, the summed output presented (thru slit) will be integrated into a single high-uniformity, high-intensity beam at all points within the cylinder [assume that no lamp will "look" directly out thru slit—i.e. without one or more reflections at cylinder wall]. The Lambertian surface will thus be highly reflective, yet non image-forming because it is also highly-diffusing.

There is no limit on the length of the exit aperture, which provides an unlimited, uninterrupted, uniform source of illumination.

The luminous source in the cylinder can be selected to optimize system performance by using incandescent lamp sources if an Infrared-rich light is needed; fluorescent is preferred if a light source with less infra-red is needed; a UV source is preferred if ultra-violet light is required; or other sources, depending on the system application and demands. All sources should produce a singular, uniform output of light from the cylinder.

The interior may, alternatively, be coated with a phosphorescent material (instead of the white reflecting/diffusing material) which, upon excitation from an appropriate source, will provide a similarly-uniform output. The color (wavelength) produced by the phosphor may also lend itself to optimizing system performance.

Superposing the illumination path onto the imaging path (as in FIG. 9) is a feature which provides simplified and compact packaging.

Figure 8:
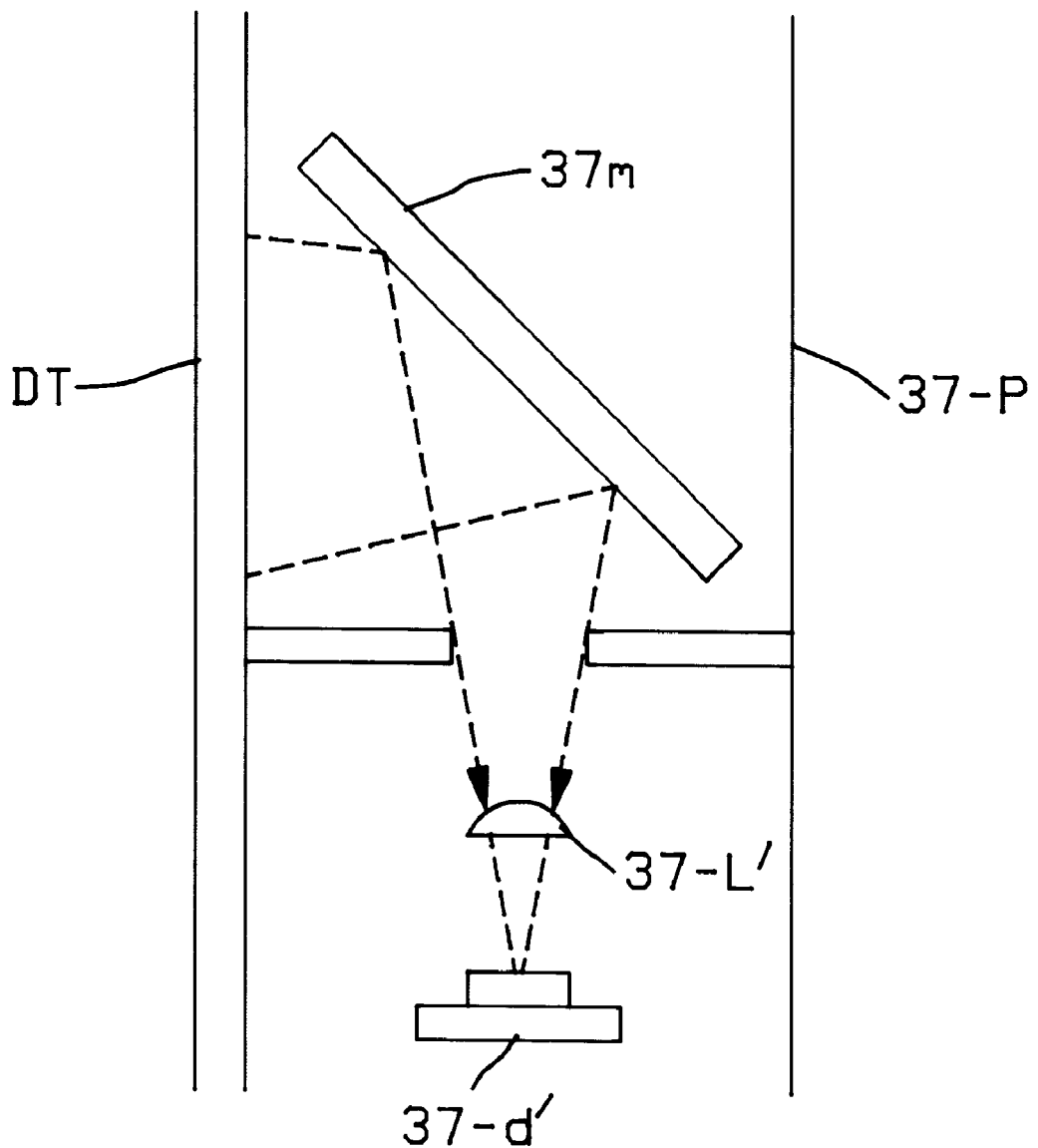
FIG. 8 is a very schematic side view of an image sensor embodiment.

Such a Lambertian Integrating Cylinder (e.g. 37), of itself, has advantages:

Higher optical efficiency than a reflector (e.g. vs. the more conventional array in FIG. 8, with mirror 37-m, image-clipper (view aperture) 37-P, lens means 37-L' and sensor means 37-d', all for documents along track DT').

Collects all the light from the lamp

Gives diffuse illumination, and avoids specular reflections from the document

Needs no critical alignment or placement of the light source (s) or minimum number thereof.

Can be easily adapted to different lamps

Typically quite compact—e.g. can be 3 inches in diameter, 6 inches high in this embodiment.

Cylinder Components, in general

Figure 11:
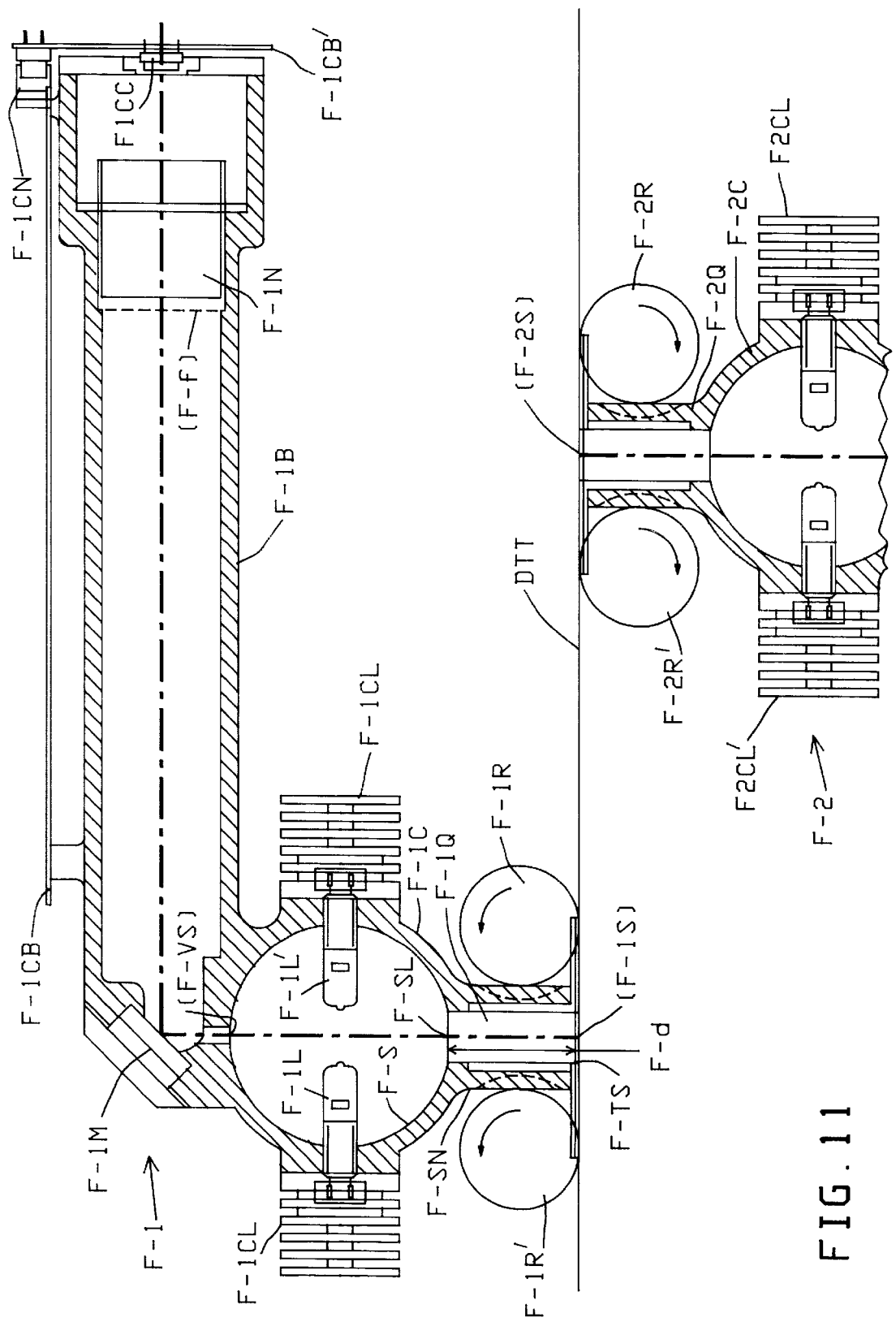
FIG. 11 is an elongate detailed sectional schematic section of a preferred combined illuminator/sensor array according to the invention.
Figure 12:
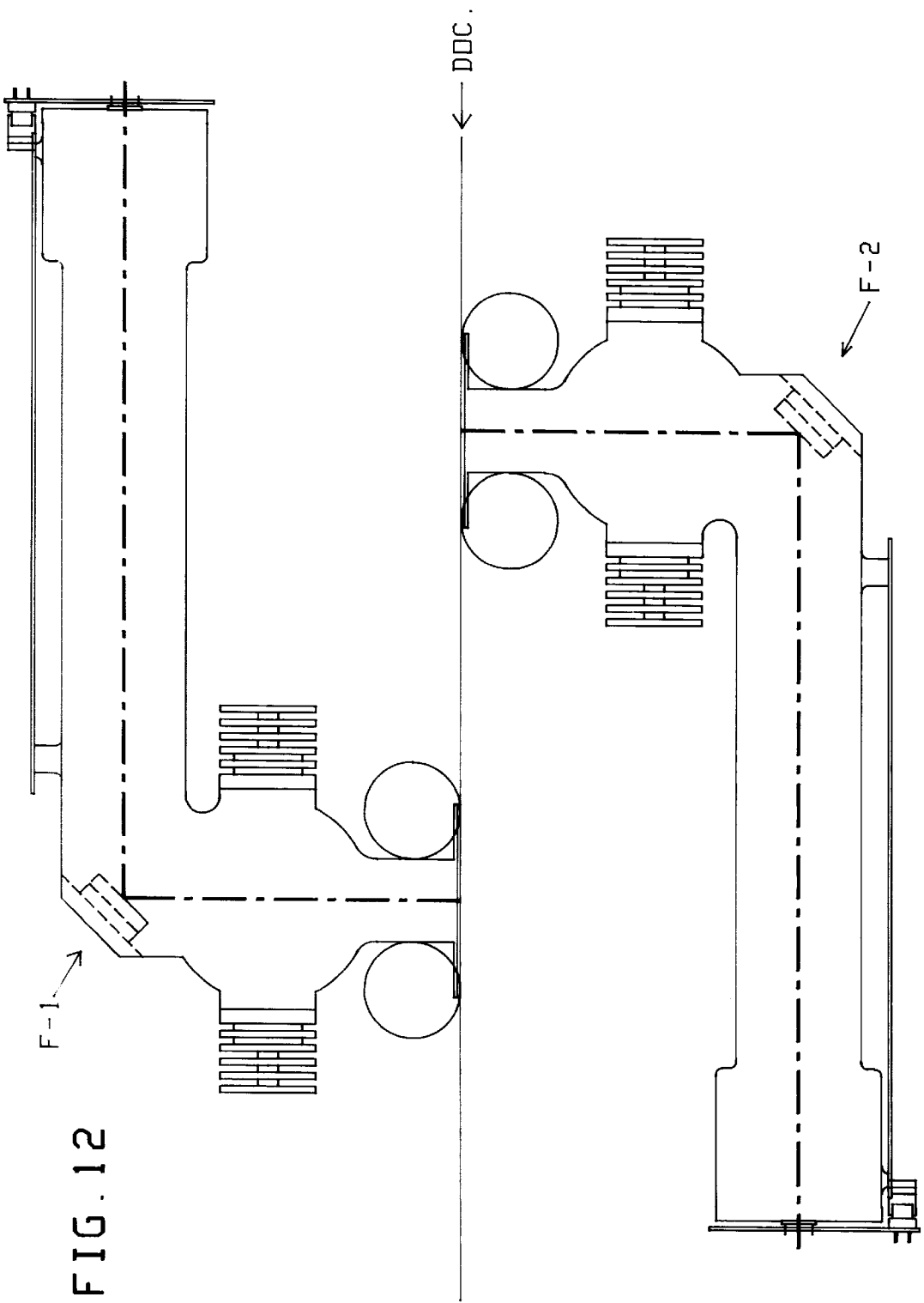
FIG. 12 is a simplistic plan view of two such preferred (Front/Rear) illumination-sensor arrays, shown offset along a document track.

Following are other general preferred characteristics for component parts of our integrating Lambertian cylinder embodiment [FIGS. 9, 11, 12]

1. Light Block

Preferably, the cylinder illumination slit (e.g. TS, FIG. 9) is filled with a glass seal, or "light block" at the track slit (e.g. Filling F-TS, FIG. 11) designed to transfer light from inside the cylinder outward, with little attenuation, and improve illumination uniformity across (the depth of) the document track. This "block" allows document rollers to be positioned for better paper control. It could be replaced with a "mirror tunnel", but a block is cheaper and uses fewer parts. [Mirror tunnel could use infra red transmitting/visible reflecting mirrors to reduce IR to the document.]

The light block should have an anti-reflection coating on the two sides used for transmission, to avoid reflections. These sides can also have an IR blocking coating: other sides of the light block need no coating. Typically, the block is about: 0.75 inches wide, 1.7 inches long and 6 inches high (e.g. see FIGS. 11, 12 below).

2. Viewing Aperture

One could use a mirror inside the cylinder, for viewing through a slit in the bottom (e.g. somewhat as in FIG. 8); on see mirror 37-M, FIG. 11) but the mirror would obstruct the interior. Or, one could place the camera (sensor) within the cylinder—though we disfavor this. Hence, we prefer to use the described viewing aperture (e.g. slit 37-VA, FIG. 9 or slit F-VS in FIG. 11) opposite the light block and track-slit (the entire camera can be mounted upon a baseplate). This viewing slit can, here, typically be 0.25 inches wide, 5 inches high, e.g. see slit S-VS FIG. 12).

3. Lamps

Surprisingly, the number and position of lamps is not critical; and no alignment is needed; thus replacement is easy for non-skilled operators; also a second string of lamps can readily be used for redundancy (back up).

For the uses indicated, we find Tungsten-Halogen lamps to be very appropriate; they are inexpensive, reliable, easily changed to give different wattage and different illumination levels. But, since high-wattage tungsten halogen lamps are apt to overheat the document, one should, in such cases, use an IR filter on the block, or else extinguish (or divert output from) the lamp(s) if a document stops at the site.

One may even use a Xenon or other arc lamp placed outside the cylinder, with light therefrom directed into the cylinder thru an associated aperture; for this, one can place an IR filter outside the cylinder; but this is more costly then using tungsten halogen lamps within the cylinder, and is non-preferred.

Or, one may coat the cylinder with fluorescent powder and excite it with a UV source(s).

Here (e.g. FIGS. 9, 11, 12) we prefer to use five 35W tungsten halogen lamps for a 500 document/minute machine, or five 100W lamps for a 2000 docs/minute machine.

4. Cylinder coating

Advantageously, the cylinder walls need not be polished; also their ex act shape and metal surface finish is not especially critical. A preferred coating is Barium Sulphate, or similar proprietary diffusing material that also has high reflectivity (about 99% pref.). Advantageously, cylinder walls may be "roughened" (e.g. via bead-blasting) to help adhere the coating, as known in the art. The coating should produce a Lambertian diffusing-reflector. The coating can be modified with IR absorber or other dyes to alter spectral response.

5. Cylinder material

Preferably aluminum is used for the walls, it is easy to cast and machine, and easy to cool and efficient for removing heat generated by interior lamps. One may air-cool the cylinder walls, or use water- cooling, depending on lamp wattage.

6. Spectral Filtering

One may introduce filter- means as needed, depending on the application. IT using tungsten lamps, one may use an infra-red filter between the viewing slit and the CCFD detector to better image "ink marks". An IR "pass filter" is recommended if one wants to see only lead pencil marks or carbon based inks.

7. Document interaction

Note that the illuminated (passing) document forms (optically) part of the wall of the cylinder, so the illumination level on the document will vary depending on the document's reflectance. These variations are usually not a problem in most applications: typical illumination change is less than 10%; and this effect is reduced if the document is spaced from the exit surface of the illumination block; e.g. 0.2 inch for a 0.75 inch wide block, though this reduces the level of document illumination. This effect is also reduced if the block is narrower; though, in such a case illumination intensity will be more dependent on the position of the document in the track; this effect is also ameliorated if the cylinder inner wall is coated with lower reflectivity material, say 90%, this reducing light to the document, of course.

Our solution: use a sensor to measure the illumination level inside the cylinder, and use the sensor output for electronic gain control or to vary power to the lamps.

Overall advantages of Lambertian illuminator:

Low initial cost

No critical adjustments

Minimize optical surfaces in the image path

Easily adapted to various lamps

Easily changed to different power levels

Excellent illumination uniformity of the document

Gives good images even from glossy documents

General Concept of Preferred Embodiment, FIG. 9

Our Lambertian illuminator means 37, in general, comprises an array of one or more lamps (e.g. 37-S, 37-S' in FIG. 9; can be one or more sets of identical halogen lamps), disposed in a cylindrical Lambertian housing 37-a having a long, narrow illumination-slit TS adapted to direct (substantially all) the light from the lamps onto a given site IS. Housing 37a may be made of aluminum; its interior surfaces are diffusing/reflective; i.e. are highly-reflective, and rendered highly-diffusing; e.g. preferably by coating with diffuse/reflecting material such as Barium Sulfate, coated in a matte finish on the inner cylinder surfaces. Such a diffusing-reflector is preferred (e.g. vs. a conventional specular mirror surface) to reflect and mix the light, and to thus project a highly uniform non-directional beam thru the illumination slit TS, onto site IS.

For optimum effect (e.g. maximum efficiency) we prefer a diffusing/reflecting surface, like that given by the mentioned BaSO4 on polished aluminum, this providing about 99% reflectance at the involved wavelengths, and yet diffusing in, essentially, all directions (cf. an "omnidirectional", "Lambertian" reflectance).

Image detection may be effected with detect means situated within the illuminating cylinder or external thereto, as indicated in FIGS. 9, 11, 12. In FIG. 9 a detector unit 37-d will be understood as disposed and adapted, as known in the art, to receive the "image-slices" reflected, from the documents passing along track DT, at prescribed imaging site IS, back through illumination-slit TS, then viewing slit 37-YA (the slices typically being processed by conventional intermediate optics, such as the indicated focusing lens system 37-L).

"Internal image detection," as functionally suggested above, will be understood as effected with an interior detector unit and associated optics which are enclosed within the cylinder walls. In some instances, we will prefer to direct the image-slices from the documents to a reflector and thence past an "image exit aperture" having an aperture designed, as known in the art,—lest one "vignette" the image path, as workers will appreciate. In most cases we will prefer that such a reflecting surface be a Lambertian type surface as mentioned above regarding the interior of cylinder 37.

Preferred Embodiment details, FIGS. 11, 12

FIG. 12 illustrates a preferred illuminator/imager embodiment arranged and adapted to accept the subject documents (see input, output arrows at "Doc.") and to image both document sides as before described; i.e. providing a Front Illumination-Imager unit F-1 and an identical Rear Illumination-Imager unit F-2, (offset from F-1 to avoid interference), each illuminating successive "slices" of a respective document side and directing the reflected "image slices" to a suitable detector stage therein, as aforementioned.

FIG. 11 is an enlarged sectional showing of one such Illumination-Imager unit F-1. Imager F-1 will be seen as, essentially, organized much like unit 37 in FIG. 9; i.e. to direct illumination, from lamp means F-1L, F-1L' to the respective imaging-site (F-1S, in phantom along document transport track DTT) and to conduct the resultant reflected image slices back, thru view-slit F-VS, via mirror F-1M, to associated detector means F-LCC (preferably a CCFD as aforedescribed) via suitable optic means (see lens F-1N), along a rectangular enclosure F-1B (camera body) housing these components as known in the art. Workers will recognize that camera body F-1B may also usefully mount (externally) associated circuit boards (e.g. F-1CB, F-1CB') on related electrical connector means (e.g. plug F-1CN).

The hollow Lambertian cylindrical lamp housing F-1C will be constructed and operated generally as aforedescribed (FIG. 9) to house lamps F-1L, F-1L' except as otherwise specified; e.g. its inner surface F-S is made highly diffusing/reflective and is preferably coated with a superior "diffser/reflector-coating", like BaSO4, applied thereon as aforodescribed. The lamp source means F-1L, F-1L' may preferably each comprise an array of two or more identical halogen lamps, distributed along the axial length of the cylinder cavity. [Or one set of sources F-1L, F-1L' may be omitted, or used as a "backup".] Each lamp will preferably be adapted to project intense "spectral" light having a wavelength range adapted to match the optimal response of the associated system and detector (F-1CC), as reflected within camera F-1 (i.e. by walls of cylinder F-1C, transmitted through illumination slit F-S, filled with glass light-guide F-IQ reflected by the document back thru F-SL, then F-VS, then by mirror F-1M and lens F-1N), passing image-slit F-VS in cylinder F-IC. Illumination slit F-SL in cylinder F-IC is matched by a like slit (aperture) F-TS at the other end of guide F-G coupling F-IC to track DTT, and filled with glass block F-IQ.

Here, we prefer each set F-IL, F-IL' to comprise five identical 100-watt Tungsten Halogen filamentary lamps, emitting light in the 450–750 Nm. (visible) range. The entire spectral output range of the lamps may be used if required, and different wattage will be acceptable in certain instances (wattage will vary directly with document speed). These will give a maximum uniform diffuse intensity thru the illumination slit F-SL. Slit F-SL will typically be of document-height, or about 6" high, and about 0.75" wide.

Note: the 5 mil thick documents typically pass along transport track DTT which is about 90 mils wide—so one should keep illumination uniform across this 90 mil, ("depth-of-illumination) and up the 6" height, at the imaging site F-IS.

We find that the slit-width Ws (of cylinder slit F-SL, and of guide slit F-TS) can be controlled to optimize uniformity of illumination.

More critical however is intensity-uniformity along the depth-direction, or z-axis (Iz), since this can vary more with slit-width Ws. For instance, with this Preferred Embodiment (FIG. 11; e.g. assume that cylinder F-IC has an inner diameter of about 3", and that slits F-VS, F-SL, F-TS are about 6" high), we have found Iz uniformity best where Ws=0.75" (cf. "flat" across a 0.25" span); and "satisfactory" for Ws=0.5", but "poor" for Ws $\leq$0.25" or Ws$\geq$1.0" (Ws=width of slit F-sL in cylinder F-1C—and track slit F-1S). So workers will want to test this Iz value (intensity uniformity along Z-axis) vs. varied Ws (e.g. with a white reflectance standard 3 to find a Ws value giving satisfactory uniform intensity Iz across the track.

As mentioned, the preferred light sources here are incandescent halogen lamps which give the indicated desired illumination (cf. 450–700 Nm. wavelength) continuously, with the appropriate current-input.

Alternative lamps are: Xenon arc, Tungsten filament and fluorescent (assuming their intensity is adequate, and their phosphors yield the indicated wavelength-range—e.g. "green phosphors" as used in FAX or Xerox systems are usually suitable). The F1-CC sensors should be approximately matched in sensitivity to the lamp output. It is also possible to coat the inner cylinder surface F-S with a phosphor (instead of BaSO4) and illuminate with a suitable UV source.

Fortunately, we find that the subject cylindrical housing F-1C disguises the actual in-cylinder location of the lamp(s) used therein (given its high-reflectivity/highly diffusive interior cylinder surface as mentioned; i.e. a diffusing-reflector—vs. a mere specular, mirror-like reflector which cannot do this). Thus, the number and location of the lamps used may be rather loosely specified, as a feature of advantage.

While a single set of lamps is adequate, a second set may be preferred (e.g. for back-up in case one set "fails"). Thus, we specify each lamp "set" as a unitary array of identical lamps (one or more, in the general case, as needed), with the "set", itself, providing well-beyond "adequate illumination" to the passing documents [i.e. "net illumination" adequate for satisfactory output across entire F1-CC, CCFD, array, after reflection/diffusion within cylinder F-1C, then reflection from document and mirror, and then passage through intermediate optics —c.f. 175 watts total, illumination (five 35-watt lamps) is found suitable here, assuming 100 ips document speed, use of silicon-cell sensors F1-CC, having good response from 450–1100 Nm., with peak response about 900Nm].

Each lamp "set" may comprise one or more lamps, with one set normally "lit", and the system arranged to automatically switch to the other set when the normally-lit set degrades to a certain level (e.g. as detected by sensor).

Thus, we also prefer to include "power-sensing" means in this system to quickly and precisely detect a prescribed change in input voltage/current to the lamps and to respond quickly, and switch-on an alternate lamp set.

Preferably, the embodiment (FIG. 11) cylinder F-1C is displaced a certain distance F-d (e.g. here, about 1.75" preferably) away from track DTT to accommodate interposition of certain elements such as transport (document-drive) rolls F-1R, F-1R' and associated belts, etc. arranged and adapted to maintain a prescribed document speed along the track past illumination slit F-sL. Thus, cylinder F-1C is preferably provided with "optical coupling means" or light guide: such as a glass block, F-IQ coupling the light From housing slit F-sL to the document track, without appreciable loss in illumination (e.g. intensity). Thus the light will appear to originate from the distal end of block F-IQ adjacent the track-slit (illumination site F-1S). Solid, rectangular glass block F-IQ is preferably about 1.75" long (F-d) and is made of Optical Quality glass to avoid degrading image resolution and has an exit aperture F-TS matching the dimensions of the cylinder illumination slit F-sL (e.g. preferably 6"×0.75", here). Also, block F-IQ is preferably housed in a protective opaque tube (snout F-SN) coupled to cylinder F-IC (e.g. cast to be integral therewith).

The inner surface F-S of cylinder F-1C is preferably made highly reflective/highly-diffusive (e.g. with the matte BaSO4 coating mentioned) for the indicated light (wavelengths) so that the document will be illuminated from a wide variety of incident angles and so that reflecting-geometries of the cylinder interior become less critical. Thus, surface F-S will be made highly "Lambertian" (e.g. so light source location and lamp-filament etc. are not apparent at imaging site F-1S—vs. "specular reflection" when source location is apparent as a "hot spot"). Similarly, the (sin) facets of glass block F-1Q are highly polished to promote total internal reflection therein, as known in the art (i.e. of light from slit F-SL to track slit F-TS).

Workers will be aware that the light-wavelengths incident on detectors F1-CC may not be optimized (e.g. gray level contrast may be poor for specific colors like reds or blues); in which case a detector-trim filter F-f may be desirable to interpose in the imaging path to improve contrast, preferably in front of the image lens F-IN (FIG. 11). In certain cases however the inner reflecting/diffusing surfaces of cylinder F-1C may be adapted to attenuate, or eliminate, undesired wavelengths from the lamps, so that such a detector trimmer filter won't be needed.

Absorption of Infra-red (heat) may be a problem —e.g. it is troublesome if conveyed to the CCPD detectors and can degrade other components (e.g. BaSO4 breaks down above 160° C., shifting the distribution of diffused wavelengths). Thus, it will typically be preferable to cool housing F-1C and to make mirror F-1M a "cold mirror" type, as known in the art.

Thus, it will typically be preferable to cool the walls of cylinder F-1C—e.g. with fins F-1CL, F-1CL' preferred for this purpose, and especially to cool the lamps, as known in the art. (Cooling fans may also be added; and/or cooling ducts within, or upon, the walls of cylinder F-1C as known in the art (e.g. a cooling jacket applied thereto.) A temperature sensor is preferably used to detect overheating (cooling failure).

Further, these inner cylinder walls may be treated to absorb IR.

RESULTS

Such illuminating-cylinder arrays (F-1, F-2) are found to provide document-illumination of a surprisingly high quality, yet do so with a very few simple components, and relatively non-critical geometries. Illumination uniformity is particularly good, without the "hot spots" etc. of conventional sources, yet with superior intensity and non-directionality (multi-directional illumination of documents).

For example, some conventional optics are thus dispensed-with; eliminating elements which are unnecessarily expensive, complicated and too geometry-critical (e.g. we use just one simple mirror and one simple focusing lens, here; no need for beam-shaping means like fibre bundles) and which require considerably more delicate, time-consuming adjustments.

Further Enhancements

In addition to the foregoing, enhancements are also contemplated; namely: constructing the camera for multiple-path lengths and compensating for "Centration Error".

Camera constructed at multiple lengths

We place a tolerance of +/−2% on the pixel size that we will accept, for two reasons, namely: variations greater then this tolerance lead to visible and objectionable irregularities in the quality of the image; and variations greater than this are very difficult for recognition systems (such as Courtesy Amount Read) to process, and lead to higher error and rejection razes for these systems.

Pixel size is a function of the magnification ratio of a given camera, which in turn is a function of the focal length of the particular lens in the camera and optical path length. A problem arises in that commercial lenses typically have focal length tolerances of the order of +/−5%, where we would require a tolerance less than 29. Such tolerances are obtainable, typically by purchasing individually selected examples of a commercial lens or having a lens custom-ground, but at a greater cost (typically 3× to 6× the cost of a comparable commercial lens).

Instead, the lens variations may be compensated for by building the camera to various path lengths, thus allowing the assembler to compensate for the variation from nominal focal length of a given lens by adjusting the other variable influencing magnification ratio, namely the path lengths.

Figure 13:
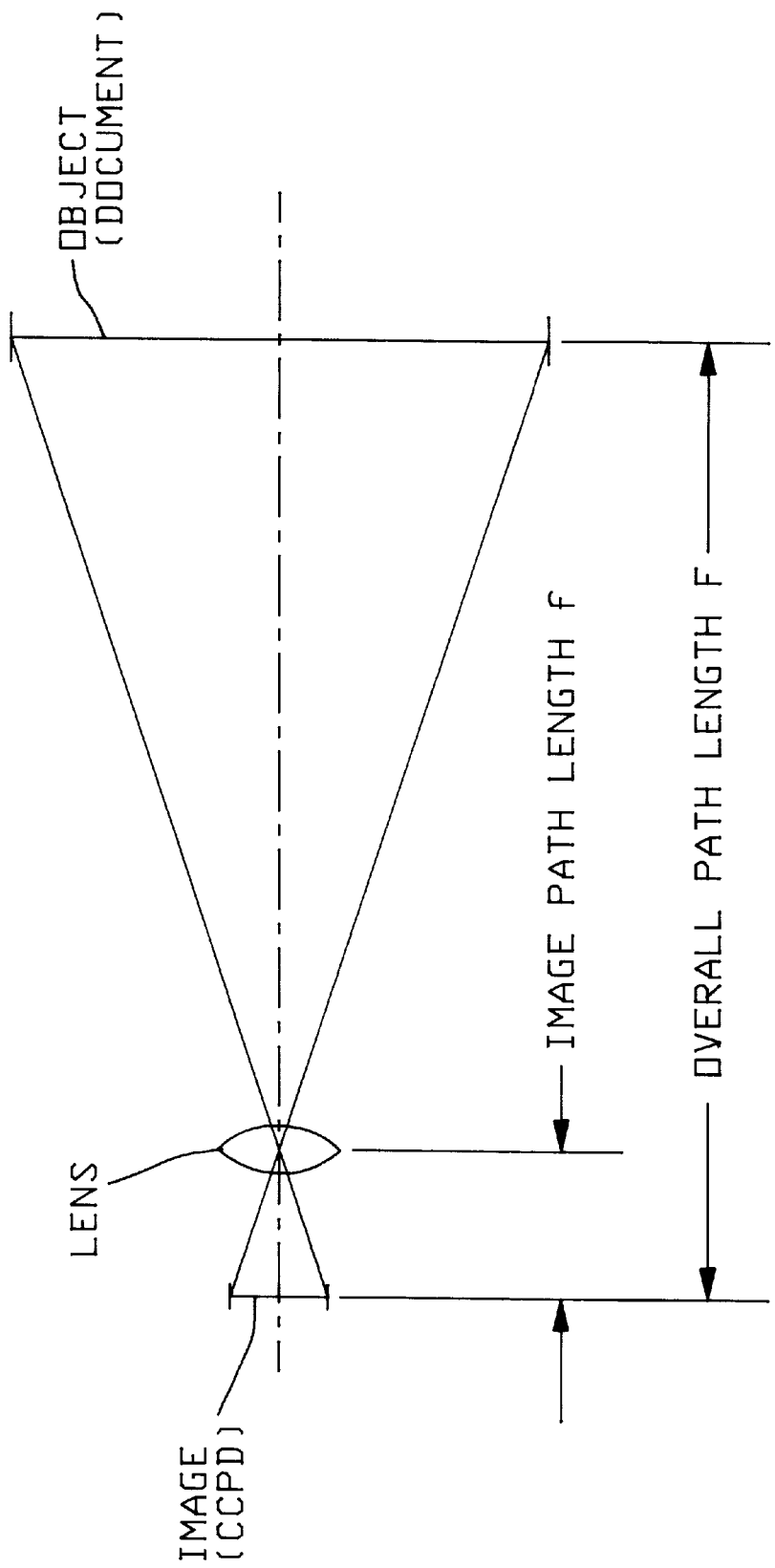
FIG. 13 is a schematic showing of "optical path" for a camera.

In FIG. 13 is depicted a schematic view of the optical path. To compensate for variations in focal length of the lens, the ratio of overall path length F to image path length f needs to be increased or decreased.

Also shown semi-schematically is the means by which we achieved this in our preferred embodiment. By means of selectable components each attached to the same basic camera body, we are able to build the camera at three different values for F/f, depending on the focal length of the individual lens in question, and achieve the magnification tolerance of +/−2% with lens varying in focal length by +/−5%. The three length combinations were calculated to allow the entire range of tolerance in the lens to be covered—the lens has its own internal focus mechanism of range limited but sufficient to adjust the lens to cover the range between the three fixed positions.

FIG. 14 depicts a "nominal case" (focal length of lens L at a nominal value, while FIG. 15 is for a minimum case (focal length of L is at "minimum value" and FIG. 16 depicts the "maximum" case (focal length of L is at a maximum).

Centration-Error

Compensation for "Centration error" refers to the fact that commercial lenses (which are typically cylindrical in form) tend to have their mechanical axis shifted from their optical axis. This is due to the accumulated errors in assembly of multiple element lenses, tolerances in the individual elements, and the like. Lenses which do not exhibit this aberration may be purchased, but at significant cost penalty (up to 10 x the cost of a commercial lens) since they are obtained by selective purchase of commercial lenses or by having a lens custom-manufactured. So a lens simply mounted with reference to its mechanical axis may "look" at a field significantly displaced from that which theoretical layout would tend to indicate. This problem is compounded by the fact that the "Centration error" at the lens is multiplied (by the magnification ratio, typically of the order or 10:1 in our cameras) at the object plane. So a lens with a "Centration error" of 0.010" at the lens plane will be looking (0.100" out of its theoretical field of view at the object plane. This error can cause the cameras to fail to see the upper or lower edge of a maximum-size document.

To remove this error, we mount the lens on a carrier which is adjustable relative to the mounting surface of the lens, and adjust it in the plane of the mounting surface, using a special fixture, until the perceived optical axis of the lens is correctly centered in the field of view which we desire. The lens is then secured in place.

Figure 17:
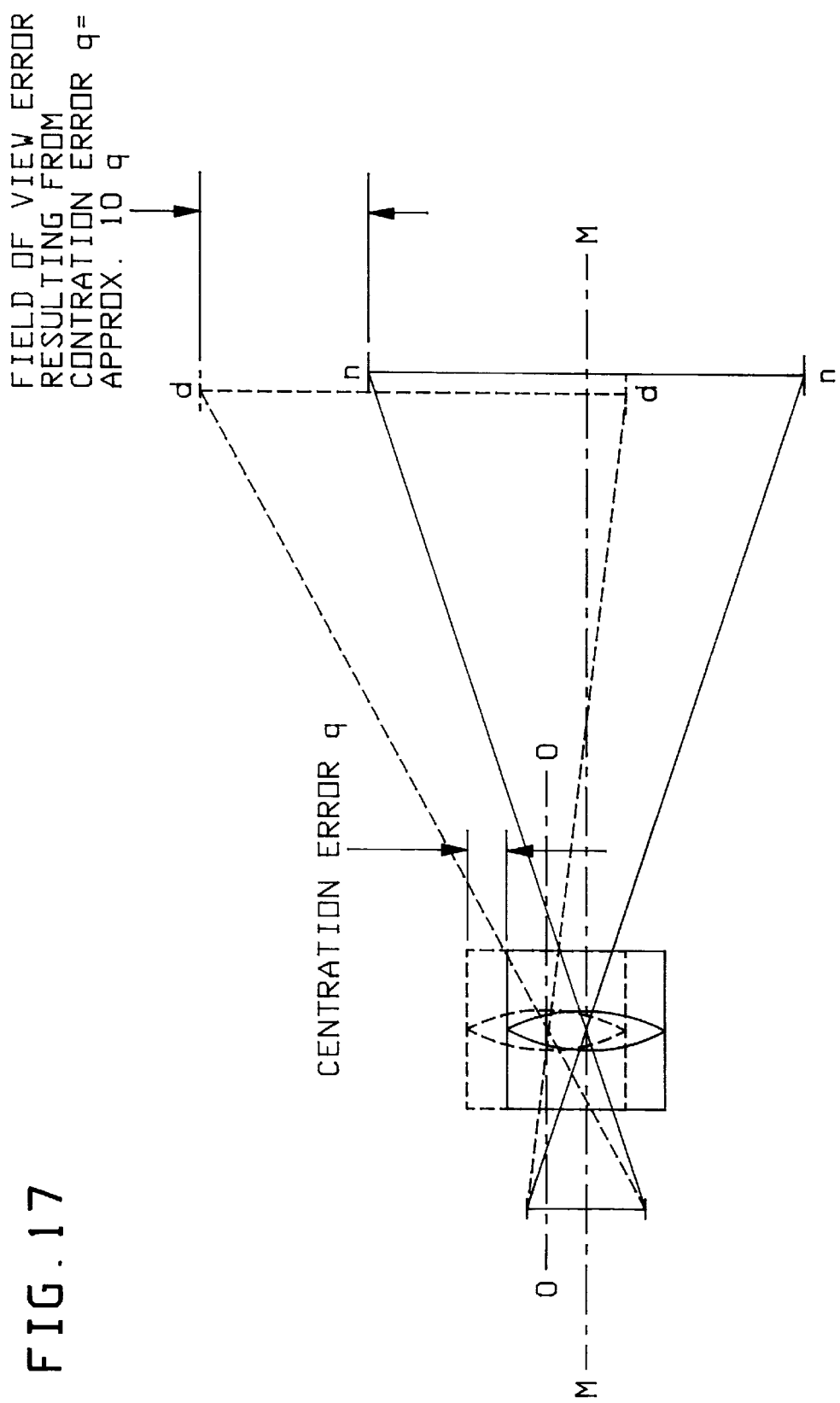
FIG. 17 schematically illustrates how "centration error" can arise.

In the attached FIG. 17, a lens is shown with mechanical axis M—M, together with theoretical field of view for that axis of m—m. Also shown is the actual optical axis D—D, offset from the mechanical axis by "Centration error" q, and the actual field of view for that axis of d—d. The error in field of view at the object plane Q=10 q, is clearly shown.

While such "Lambertian illuminating-cylinder" arrays are here seen as particularly advantageous for use with automatic, high-speed document imaging scanners, as described, workers will appreciate that they have utility for other analogous applications, such as for high-speed imaging and/or copying (e.g. by xerography; e.g. for drum illumination) or for optical character recognition generally.

Our high-reflectivity/high diffusion hollow "integrating Lambertian cylinder" will be seen to give light which is highly uniform, yet more "multi-directional" than usual, and is very apt for avoiding problems from creases, folds, etc. in documents (e.g. less "shadowing" therefrom).

We prefer a hollow cylindrical vessel (e.g. as opposed to spherical) with lamp-source(s) disposed therein to induce multiple reflections off the inner wall before emission to the document site (vs. direct illumination by lamp-to-document, without cylinder-wall reflection). Other forms of indirect illumination are suggested in U.S. Pat. No. 4,769,716, though not with a hollow cylinder or the like.

In conclusion, it will be understood that the preferred embodiments described herein are only exemplary, and that the invention is capable of many modifications and variations in construction, arrangement and use without departing from the spirit of the claims.

For example, the means and methods disclosed herein are also applicable to other related illumination (e.g. other imaging systems). Also, the present invention is applicable for enhancing other forms of illumination and related optical arrangements.

The above examples of possible variations of the present invention are merely illustrative. Accordingly, the present invention is to be considered as including all possible modifications and variations coming within the scope of the invention as defined by the appended claims.

What is claimed:

1. A system for illuminating documents in a document-processing system wherein a large number of checks is automatically transported past one or more imaging stations, each station having a prescribed respective imaging-site which is illuminated by prescribed source means which projects an illumination-beam thereto; each said source means compromising: a hollow cylindrical integrating vessel housing one or more lamps and imaging aperture means adapted to project the energy of said lamps to the respective said imaging-site; the lamps all being adapted to direct all their light to the inner wall of said cylinder for reflection/diffusion there, said wall being adapted to integrate all the light and reflect/diffuse it to said aperture means in Lambertian fashion.

2. The system of claim 1 wherein there are two or more said stations, each with its respective imaging site and associated illumination beam, each being highly-diffused and highly uniform in intensity.

3. In a document processing system wherein a large number of documents is rapidly automatically transported past one or more imaging stations, each station having a prescribed imaging-site, illuminated by a respective illumination beam from prescribed source means; each said source means comprising a hollow vessel with one or more lamps therein and having a Lambertian reflecting/diffusing inner vessel-wall, and adapted to project, through an associated slit, a highly-diffused illumination beam to the respective imaging site.

4. An automatic document-processing apparatus having at least one Imager with at least one imaging site, each said site being illuminated by a beam from a respective source means, each source means comprising a hollow integrating vessel having reflective/diffusing Lambertian inner walls and housing one or more lamp means, while also having an illumination-aperture adapted to illuminate its respective imaging site with a high-intensity, highly-diffuse beam; wherein said apparatus also includes camera means responsive to document-reflected light; and wherein said vessel also has a viewing aperture for conducting document-images reflected back through said illumination-aperture to said camera means.

5. The invention of claim 4 wherein said vessel is cylindrical.

6. The invention of claim 5 wherein at least one set of identical lamps is disposed within said vessel.

7. The invention of claim 6 wherein said lamps are the Tungsten-halogen filamentary type.

8. The invention of claim 6 wherein radiation sensor means is also provided within said vessel to monitor the intensity of lamp radiation and to responsively provide an output to associated control means.

9. The invention of claim 8 wherein said control means includes means for adjusting input-wattage to the lamps and/or means for adjusting overall system gain.

10. The invention of claim 4 wherein said camera means is provided external to said vessel.

11. The invention of claim 4 wherein said illumination-aperture is adapted to shape the output beam from said vessel and includes light-guide means optically coupling said vessel to the respective imaging site.

12. An automatic document-processing apparatus having at least one Imager with at least one imaging site, each said site being illuminated by a beam from a respective source means, each source means comprising a hollow integrating vessel having reflective/diffusing Lambertian inner walls and housing one or more lamp means, while also having an illumination-aperture adapted to illuminate its respective imaging site with a high-intensity, highly-diffuse beam; wherein said lamp means are disposed outside the vessel walls but coupled thereto optically to direct substantially all their light to be reflected by said inner walls.

13. The invention of claim 12 wherein said vessel is cylindrical and wherein said unit also includes camera means responsive to document-reflected light; and wherein said vessel also has a viewing aperture or conducting document-images reflected back through said illumination-aperture to said camera means.

14. An arrangement for illuminating and imaging documents in a document-processing system wherein an automatic large number of documents is rapidly transported past one or more imaging stations, each station having a prescribed source means comprising a hollow Lambertian integrating cylinder which projects a highly-uniform, yet highly diffuse illumination-beam.

15. The arrangement of claim 14 wherein there are two or more stations each with a respective illumination beam.

16. In a method of implementing a document-processing system wherein a large number of documents is rapidly, automatically transported past one or more imaging stations, each station having a prescribed imaging-site, illuminated by a respective illumination beam from prescribed lamp means; the steps of:

disposing said lamp means in a hollow Lambertian vessel having a Lambertian reflecting/diffusing inner vessel-wall and an associated illumination slit adapted to project said illumination beam; and arranging the lamp means to direct substantially all its light to be reflected a number of times by said inner wall; while making the inner wall a Lambertian surface which both reflects and diffuses substantially all the light.

17. The method of claim 16 wherein said slit is filled with optical glass; and wherein said vessel is coupled to associated camera means, via image-aperture means cut through said vessel walls.

18. The method of claim 17 wherein said lamp means comprises one or more tungsten halogen lamps.

19. The method of claim 17 wherein said lamp means comprises one or more xenon arc lamps.

20. The method of claim 16 wherein said lamp means is disposed outside said vessel.

* * * * *